United States Patent [19]

Takada

[11] 4,152,026
[45] May 1, 1979

[54] BELT CARRIED AUTOMATIC LOCKING RETRACTOR

[75] Inventor: Juichiro Takada, Tokyo, Japan

[73] Assignee: Takata Kojyo Co., Ltd., Tokyo, Japan

[21] Appl. No.: 852,121

[22] Filed: Nov. 16, 1977

[30] Foreign Application Priority Data

Dec. 13, 1976 [JP] Japan .......................... 51-165906[U]

[51] Int. Cl.² ...................... A62B 35/00; A44B 11/10; A44B 11/12
[52] U.S. Cl. ...................................... 297/388; 24/171; 24/196
[58] Field of Search ............. 297/388; 242/107, 107.2, 242/107.4 R; 24/170, 171, 196, 77 R

[56] References Cited

U.S. PATENT DOCUMENTS

| | | | |
|---|---|---|---|
| 2,822,595 | 2/1958 | Ruhl | 297/388 X |
| 2,938,254 | 5/1968 | Gaylord | 24/171 |
| 3,211,496 | 10/1965 | Zaydel | 242/107.2 |
| 3,212,152 | 10/1965 | Tanaka et al. | 24/77 R |
| 3,227,489 | 1/1966 | Stubblefield | 297/388 |
| 3,233,296 | 2/1966 | Whittingham | 297/388 X |
| 3,246,929 | 4/1966 | Taggart | 297/388 |
| 3,248,148 | 3/1966 | Board et al. | 24/77 R |
| 3,249,386 | 5/1966 | Board et al. | 24/196 X |
| 3,409,949 | 11/1968 | Kobehel et al. | 297/388 X |
| 3,891,273 | 6/1975 | Takada | 297/388 |
| 3,927,912 | 12/1975 | Takada | 297/388 |

Primary Examiner—James T. McCall
Attorney, Agent, or Firm—Wolder, Gross & Yavner

[57] ABSTRACT

An automatic locking belt carried safety belt take-up reel includes a U-shaped polymeric resin body member having a cross web and side arms and a spring biased reel journaled between the side arms proximate the cross web. A buckle coupling tongue is longitudinally slidably engaged between the confronting outer ends of the side arms and projects forwardly thereof and is provided with a wide transverse slot between the side arms. A knurled locking bar longitudinally slidably rests on the end borders of the slot and a safety belt has one end anchored to the reel and extending from the bottom thereof upwardly through the slot rearward of the lock bar, about the lock bar and then downwardly between the lock bar and the front edge of the slot and then rearwardly through a guide formed proximate the cross web bottom edge and then to a vehicle anchor point. Withdrawal of the belt is effected by pulling the body member with the tongue being free and locking is affected in response to a pull on the tongue plate attendant to the belt engaging a seat occupant and the tongue engaging a buckle.

10 Claims, 4 Drawing Figures

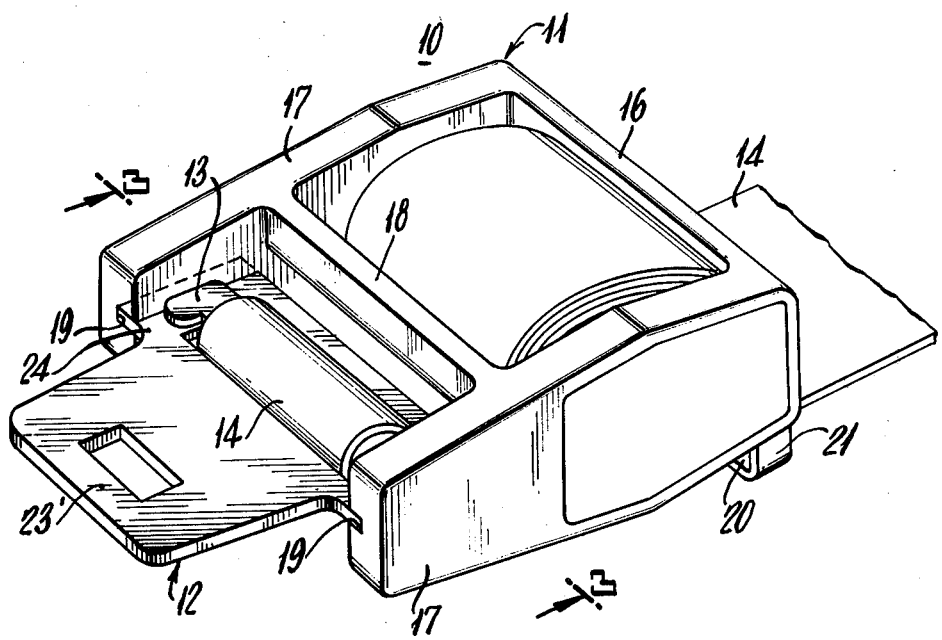
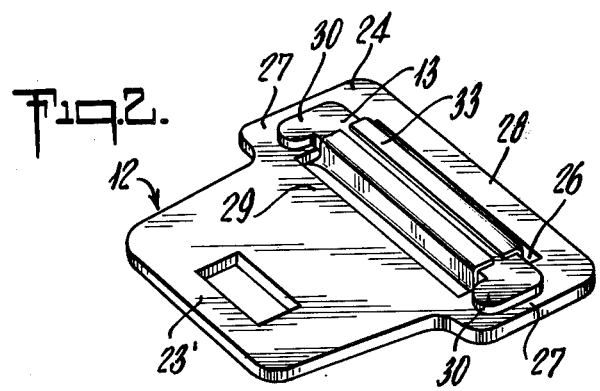
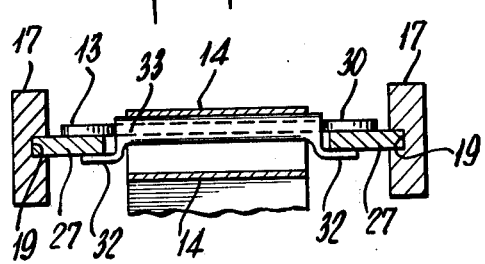
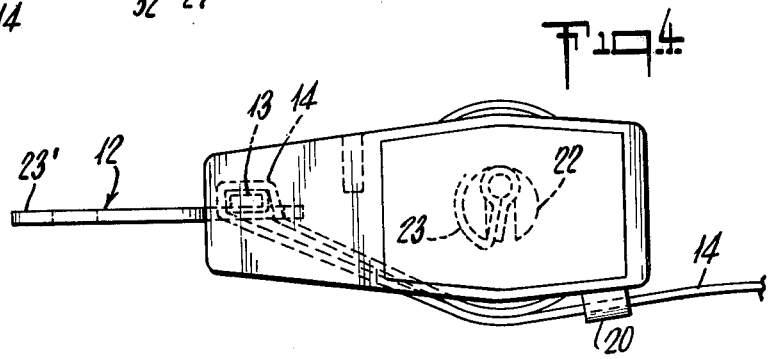

BELT CARRIED AUTOMATIC LOCKING RETRACTOR

BACKGROUND OF THE INVENTION

The present invention relates generally to improvements in safety belt retractor device and it relates more particularly to an improved automatic locking belt retractor reel of the belt carried type.

There are generally two broad types of automatic locking safety belt retractor reels which are widely employed, one in which the reel device is anchored directly to the vehicle body and the other in which the reel device is carried by the free end of the safety belt, the opposite end of the belt being anchored to the vehicle. While the vehicle mounted type of safety belt reel has many advantages, it possesses an important drawback in that being of relatively large size or bulk, it cannot be installed in many vehicles because of the lack of sufficient space and as a consequence, retractor reel devices of the second type must be used. However, while many forms of automatic locking belt carried retractor wheels have been heretofore proposed, they leave much to be desired. Typical of such retractor reels is that described in U.S. Pat. No. 3,227,489 to Stufflefield in which an articulated body member includes a buckle coupling tongue section and a retractor wheel mounting section which are swingably pivoted to each other, the locking and unlocking of the belt being responsive to the angular relationship of the two sections. This latter type of reel is complex, expensive and often unreliable and inconvenient and awkward to apply and use.

SUMMARY OF THE INVENTION

It is a principal object of the present invention to provide an improved safety belt retractor device.

Another object of the present invention is to provide an improved automatic locking safety belt retractor device.

Still another object of the present invention is to provide an improved automatic locking safety belt retractor device of the belt carried type.

A further object of the present invention is to provide an improved safety belt carried device which functions as a belt coupling unit and as a belt take-up reel.

Still a further object of the present invention is to provide a coupling tongue mounted, belt carried belt retractor device which is automatically locked in response to the linear or translational movement of the tongue away from the belt rewind reel.

Another object of the present invention is to provide an improved device of the above nature characterized by its simplicity, compactness, ruggedness, reliability, low cost, ease of manufacture and assembly, ease and convenience of operation and application, and great versatility and adaptability.

The above and other objects of the present invention will become apparent from a reading of the following description taken in conjunction with the accompanying drawings which illustrate a preferred embodiment thereof.

In a sense the present invention contemplates the provision of an improved automatic locking belt carried belt retractor device comprising a body member, a transversely extending take-up reel rotatably mounted to said body member, spring means biasing said reel to rotate in a belt retraction direction, a belt coupling member longitudinally slidably mounted to said body member forwardly of said reel and projecting forwardly of said body member and having a transversely extending opening in its rear portion, a locking bar registering with and extending transversely in registry with said opening and being longitudinally movable relative to said opening and a belt having an end thereof secured to said reel and being windable in said reel, said belt extending from said reel rearwardly, upwardly through said opening proximate the rear edge of said locking bar, rearwardly about the top of said locking bar and downwardly through said opening proximate the forward edge of said locking bar and thence rearwardly toward an anchoring point proximate the opposite end of said belt.

According to a preferred form of the improved retractor device, the body member is formed of a synthetic organic polymeric resin and is U-shaped including a rear cross-piece and forwardly projecting parallel side arms, the reel being journaled between the side arms proximate the cross-piece. Parallel longitudinal track grooves are formed in the confronting faces of the side arm front portions and the coupling member is a buckle coupling tongue plate having a transversely enlarged rear section whose side borders slidably engage the track grooves. A transversely extending slot is formed in the tongue member rear section and the locking bar is relatively flat and knurled and longitudinally rests on the side borders of the slot and terminates at its side ends in yoke portions which longitudinally slidably engage the side borders of the slot. Extraction of the belt from the reel is effected merely by pulling the body member with the tongue member being freely movable therein so as to permit such withdrawal of the belt. However, when the tongue member is coupled around an occupant to an anchored buckle, any pull on the belt pulls the locking bar outwardly to lock the belt and prevent withdrawal thereof. Unbuckling of the tongue plates releases it.

The improved belt carried retractor device is reliable, simple and rugged, economical to fabricate and assemble, and easy and convenient to apply and operate.

BRIEF DESCRIPTION OF THE DRAWINGS

FIG. 1 is a top perspective view of a retractor device embodying the present invention;

FIG. 2 is a top perspective view of the tongue member and locking bar assembly thereof;

FIG. 3 is a sectional view taken along the line 3—3 in FIG. 1; and

FIG. 4 is a side elevational view thereof.

DESCRIPTION OF THE PREFERRED EMBODIMENT

Referring now to the drawings which illustrate a preferred embodiment of the present invention, the reference numeral 10 generally designates the improved belt carried or minor automatic locking belt retractor device which includes a main body member 11, a tongue member 12 and a locking bar 13. The retractor device 10 is carried by the inner end of a belt 14, the outer end of which is anchored in a suitable manner at one side of a vehicle seat. A suitable buckle or coupling device, not shown, for releasably engaging the coupling tongue member 12, is anchored either directly or by way of a connector member to the opposite side of the seat.

The body member 11 is advantageously integrally formed of a suitable synthetic organic polymeric resin and is of U-shaped configuration including a rear cross wall or cross-piece 16 and forwardly longitudinally projecting parallel side arms 17 the upper intermediate portions are joined by a reinforcing cross bar 18. Formed in the confronting faces of the forward end portions of side arms 17 are parallel coplanar track or guide grooves 19 which extend rearwardly from the side arm front ends to a point short of cross-bar 18. A transversely extending belt guide 20 is suspended from the rear ends of side arms 17 proximate cross wall 16 by end arms 21 depending from side arms 17.

A reel or spindle is disposed between cross members 16 and 18 and extends between and is suitably journaled to the side arms 17 so as to be rotatable in opposite counterclockwise belt retraction and clockwise belt extraction directions as viewed in FIGS. 1 and 4. A coiled wind-up spring 23 of known construction is connected between reel 22 and a side arm 17 and biases the reel to rotate in a belt retraction direction and is loaded with the belt extraction rotation of the reel. The inner end of the belt 14 is secured to the reel 22 so as to be retracted with the counterclockwise rotation of the reel.

The tongue member 12 is in the form of a flat plate and includes a rectangularly apertured front buckle coupling tongue portion 23' and a transversely enlarged rear head portion 24 whose outer lateral borders slidably engage respective track grooves 19, the tongue portion 23' projecting forwardly of body member side arms 17. Formed in the rear head portion 24 is a transversely extending rectangular slot 26 which extends to points inwardly of the confronting face of side arms 17 and is delineated by side end borders or frame legs 27, rear border or frame leg 28 and front border or frame leg 29.

The locking bar 13 extends transversely across and registers with the opening 26 and terminates in enlarged flat faced end portions 30 which slidably rest on the top faces of opening side borders 27, the longitudinal dimension of locking bar 13 being less than that of opening 26. Defining yokes with end portions 30 and disposed below and parallel to the respective end portions 30 are arms 32 which are secured to the locking bar 13 and slidably engage the underfaces of side frame legs 27 to longitudinally slidably retain the locking bar 13 in registry with opening 26. The outer surface of the locking bar 13 is knurled and encircles by a high friction or knurled sleeve, as at 33.

The belt 14 extends forwardly from the bottom rear portion of the belt thereof wound on the reel 22 upwardly through the space between the proximate rear edge of locking bar 13 and rear frame leg 28, and then forwardly around along the top face of locking bar 13 and downwardly through the space between the front edge of locking bar 13 and frame leg 29 and thence rearwardly below the forwardly extending portion of belt 14 through the belt guide 20 and to the anchor point at the belt outer end. The belt 14 extends approximately 180° about the locking bar 13.

In the operation of the retractor device 10 described above, when the device is bot being used, the tongue member 12 and the reel carrying body member 11 are united as a unit by the reinforcing power or pull of belt 14 effected by reel 22 and remain as it is. When the united tongue and body members are to be extracted in order to engage a complementary buckle, the body member 11 is manually gripped at the walls 17 of the body member and pulled toward the mating buckle to be engaged therewith, the pull overcoming the retarding force of the lock bar 13 to permit the withdrawal of the belt 14 smoothly from the belt reel 22 and finally to a buckle tongue engaging position. It should be noted that as the body member is pulled to unwind the belt the tongue member 12 is fully retracted and the space between lock bar 13 and rear frame leg 28 is open to permit the passage of belt 14 through this space, such passage being permitted even when the body member is not pulled as long as tongue member 12 is not moved forwardly of the body member 11.

Completion of the engagement of the tongue member 12 by the complementary buckle effects movement of the lock bar 13 rearwardly toward the tongue member rear frame leg 28, being driven by the belt take-up force and the forward movement of tongue member 12 relative to body member 11 to thereby result in the holding of the belt securely and powerfully between the lock bar rear edge and the inside or rear edge of the tongue member rear frame leg 28 to effect the automatic locking of the belt and prevent withdrawal thereof. In this case, the forward movement of the the tongue member 12 relative to the body member 11 and the sliding rearward motion of the lock bar 13 consequent to the pull on the belt by the occupant following the withdrawing and retraction of the belt to occupant's body size effects the contraction between lock bar 13 and rear frame leg 28.

Upon the manual selective disengagement of the tongue member 12 from the associated buckle, the take-up force by the reel 22 of belt effects the belt winding and the smooth operation thereof is continued by reason of the multiple contribution of both the sliding movement of the tongue member 12 and lock bar 13.

As explained above, in the present improved device 10, the relatively free transferring motion of the body member 11 to the tongue member 12 is made possible by the take-up driving force from the belt 14 since these members are slidably associated by reason of the side edges of tongue member 12 slidably engaging longitudinal grooves 19. Further to the lock bar 13 is also arranged so as to be freely slidable at the rear portion 24 of the tongue member 12. Each of these members can be manufactured independently of each other and then production and assembling of each is simplified without any adverse effect on each other. Still further good interchangeability for a part member is positively achieved which is an excellent advantage and results in low cost in mass production.

Multiple effectiveness of both sliding motions of two members makes possible the extraction and retraction of the belt smoothly without any resistance. Still another advantage which is realized is that no relative rotational motion between parts is required for operation as in the earlier type of retractor (U.S. Pat. No. 3,927,912). Therefore, an occupant here can engage and disengage the buckle only whilekeeping his body moving along forwardly and rearwardly; this contributes greatly to the ease and smoothness of belt harnessing by the occupant. Simplicity, convenience and reliability are important advantages of the present improved device.

While there has been described and illustrated a preferred embodiment of the present invention, it is apparent that numerous alterations, additions and omissions may be made without departing from the spirit thereof.

I claim:

1. An automatic locking belt carried belt retractor comprising a body member including a rear portion and a front portion, a belt take-up reel mounted in said body member rear portion and rotatable in opposite belt extraction and belt retraction directions, spring means biasing said reel to rotate in a belt retraction direction, a coupling member longitudinally slideably mounted in said body member front portion and including a rear section having a transversely extending opening therein with front and rear edges, a transversely extending locking bar registering with said opening and spaced from between said front and rear edges and mounted to said coupling member and longitudinally movable thereon, and a belt secured to and partly wound thereon and extending forwardly and below said reel and then upwardly through said opening rearward of said locking bar, forwardly about said locking bar, downwardly through said opening forward of said locking bar and thence rearwardly to a belt anchor point whereby a pull on said coupling member to move said coupling member forwardly relative to said body member effects the contraction between said locking bar and said rear edge to clamp said belt there between and release of said coupling member permits the separation of said locking bar and rear edge and the movement of said belt therebetween.

2. The retractor device of claim 1 wherein said body member is of U-shaped configuration including a rear transverse cross arm and transversely spaced longitudinally extending parallel side arms, said reel extending between said side arms forward of said cross arm.

3. The retractor device of claim 2 wherein said coupling member has a rear portion extending between and longitudinally slidably coupled to the forward portions of said side arms.

4. The retractor device of claim 3 wherein said side arms have parallel longitudinal track grooves formed in the confronting faces thereof and said coupling member comprises a tongue plate with a rear portion with side edges slidably engaging said track grooves.

5. The retractor device of claim 4 wherein said locking bar slidably rests on said tongue plate adjacent the side end of said opening.

6. The retractor device of claim 5 wherein said opening is of rectangular configuration with longitudinally extending side borders and said locking bar terminates at its side ends in yoke members slidably engaging said borders.

7. The retractor device of claim 2 wherein said locking bar has a high friction peripheral face.

8. The retractor device of claim 2 wherein said body member is formed of a synthetic organic polymeric resin.

9. The retractor device of claim 2 including a longitudinal belt guide depending from the rear portion of said body member, said belt extending forwardly from said opening.

10. A belt carried type of automatically locking vehicle safety belt retractor comprising:
a body member in which a reel energized in advance toward the winding direction is bridged across the rear side arms of said body member and truck grooves are provided parallel to and inside of the front part of both side arms from the front edge in a rearward direction, and a tongue member which includes a tongue plate designed to be engaged with and disengaged from a buckle and is provided with an opening for the belt to pass through and further there is bridged a locking bar slidably over said opening just being located across the both side arms thereof whereby, with said tongue member having its both side edges inserted into said rails of said body member, the withdrawing of the belt wound on said reel is extended to below a first gap provided between the opening rear edge and the rear edge of said lock bar, passes upwardly through the first space gap, turns over 180° around said lock bar, then passes downwardly through a second gap provided between the front edge of said lock bar and the front edge of said opening and finally goes back in a rear direction, said tongue member being releasably retained toward said reel by means of winding retracting force of the belt.

* * * * *